United States Patent [19]

Yoo

[11] 4,319,983

[45] Mar. 16, 1982

[54] PASSIVATION PROCESS

[75] Inventor: Jin S. Yoo, Flossmoor, Ill.

[73] Assignee: Atlantic Richfield Company, Philadelphia, Pa.

[21] Appl. No.: 150,863

[22] Filed: May 19, 1980

[51] Int. Cl.$^3$ .................... C10G 11/18; C10G 47/12
[52] U.S. Cl. .................................. 208/114; 208/46; 208/520 CT; 208/106; 208/108; 208/118; 208/119; 208/120; 252/412; 252/414; 252/420; 252/437
[58] Field of Search ................ 208/113–114, 208/52 CT, 118, 119, 120; 252/411–415, 420

[56] References Cited

U.S. PATENT DOCUMENTS

| | | | |
|---|---|---|---|
| 2,579,123 | 12/1951 | Pardee | 252/412 |
| 2,758,097 | 8/1956 | Doherty et al. | 252/413 |
| 2,850,462 | 9/1958 | Plank | 252/412 X |
| 2,921,018 | 1/1960 | Helmers et al. | 208/114 |
| 4,098,678 | 7/1978 | Schwarzenbek | 208/120 |
| 4,101,444 | 7/1978 | Burk et al. | 208/120 X |
| 4,198,320 | 4/1980 | Chester et al. | 208/120 X |

*Primary Examiner*—Delbert E. Gantz
*Assistant Examiner*—G. E. Schmitkons
*Attorney, Agent, or Firm*—Stanley M. Welsh

[57] ABSTRACT

A passivation process for decreasing the poisonous effects from contamination by metals, such as vanadium, iron, nickel or copper that can occur during a catalytic conversion of a hydrocarbon feedstock containing such metals is disclosed. The process employs compositions of organic or aqueous media containing one or more, at least partially soluble species of silicon, alone or in combination with phosphorus and/or aluminum-containing materials or species.

19 Claims, No Drawings

PASSIVATION PROCESS

BACKGROUND OF THE INVENTION

This invention relates to a process for reducing poisonous effects of metal contaminants such as iron, nickel, vanadium and the like picked up by a hydrocarbon conversion catalyst during a hydrocarbon conversion process such as the high temperature conversion of a hydrocarbon feedstock containing such metals to a lower boiling product. More particularly, this invention relates to processes for reducing the poisonous effects of metal contaminants without removal of such contaminants from the catalyst, e.g., by a process of passivation.

During a catalyst promoted chemical conversion metal contaminants such as iron, nickel, copper and vanadium, the catalyst may become more and more deactivated due to the pick up of at least a portion of such metal contaminants. Removal of such poisons from the catalyst may restore a substantial amount of the catalytic activity. However, no matter how carefully the process for the removing the metal poisons from the catalyst is carried out, some penalty in the form of overall performance is often paid. Accordingly, a simple and straight forward method of overcoming the deleterious effects of the metal poisons or contaminants is desirable.

Catalytically promoted methods for the chemical conversion of hydrocarbons include cracking, hydrocracking, reforming, hydrodenitrogenation, hydrodesulfurization, etc. Such reactions generally are performed at elevated temperatures, for example, about 300° to 1200° F., more often 600° to 1000° F. Feedstocks to these processes comprise normally liquid or solid hydrocarbons which, at the temperature of the conversion reaction, are generally in a fluid, i.e., liquid or vapor, state and the products of the conversion usually are more valuable, lower boiling materials.

Although referred to as "metals", these catalyst contaminants may be present in the hydrocarbon feed in the form of free metals or relatively non-volatile metal compounds. It is, therefore, to be understood that the term "metal" as used herein refers to either form. Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present in petroleum stocks, including some iron, petroleum stocks also have a tendency to pick up tramp iron from transportation, storage and processing equipment. Most of these metals, when present in a stock, deposit in a relatively non-volatile form on the catalyst during conversion processes so that regeneration of the catalyst to remove deposited coke does not also remove these contaminants. With the increased importance of gasoline in the world today and the shortages of crude oils and increased prices, it is becoming more and more important to process any type or portions of a crude source, including those highly metal contaminated crudes to more valuable products.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate on the catalyst and, since they affect process performance, they are also referred to as "poisons". A poisoned catalyst with these metals generally produces a higher yield of coke and hydrogen at the expense of desired products, such as gasoline and butanes. For instance, U.S. Pat. No. 3,147,228 reports that it has been shown that the yield of butanes, butenes and gasoline, based on converting 60 volume percent of cracking feed to lighter materials and coke dropped from 58.5 to 49.6 volume percent when the amount of nickel on the catalyst increased from 55 ppm to 645 ppm and the amount of vanadium increased from 145 ppm to 1480 ppm in a fluid catalytic cracking of a feedstock containing some metal contaminated stocks. Since many cracking units are limited by coke burning or gas handling facilities, increased coke or gas yields require a reduction in conversion or throughput to stay within the unit capacity.

Several U.S. patents exemplifying the passivation approach to reducing the poisonous effects of metal contaminants on a conversion catalyst are discussed hereinafter.

U.S. Pat. No. 2,901,419 (1959) discloses a method for preventing undesirable catalytic effects during a catalytic conversion of a hydrocarbon feedstock than would otherwise result from an accumulation of metal or metal-containing impurities, e.g., iron, nickel and/or vanadium, on a catalyst surface. The method comprises introducing together with the contaminated catalyst in a catalyst zone, at least one material selected from the group consisting of metals of the periodic system of Groups III and IV, and metals of the right-hand subgroups of Groups I and II of the periodic system. Specific metals named from the cited groups were copper, silver, gold, tin, zinc, cadmium and mercury. The catalyst zone discussed in the examples was a muffle furnace at 1000° F. for two hours. Powdered zinc and powdered zinc fluoride were the only materials used in the examples to demonstrate the invention.

U.S. Pat. No. 3,711,422 (1973) discloses a method for restoring the activity of metal contaminated cracking catalysts by a passivation process involving antimony containing compounds which are either oxides or convertible to oxides of antimony upon calcination. The passivation process involves contacting the cracking catalyst with antimony-containing compounds so as to deposit them on the catalyst, e.g., by impregnation, dry mixing or deposition from suitable carrying agents.

U.S. Pat. No. 4,031,002 (1977) discloses a method for passivating metal contaminants, e.g., nickel, vanadium and/or iron in a catalyst by contacting such a catalyst with an antimony compound containing phosphorodithioate ligands having the following general formula:

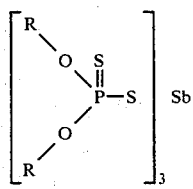

wherein the R groups which can be the same or different are hydrocarbyl radicals containing from 1 to about 18 carbon atoms per radical, the total number of carbon atoms per antimony compound molecule being from 6 to about 90.

The disclosed phosphorus and antimony compounds can be added to the feedstock prior to the cracking zone. There is no suggestion that the phosphorus present in the antimony compound plays an active role in the metals passivation process. Only the concentration of the antimony present in these compounds in relation to the amount of metal contaminants either in the feed or on the contaminated catalyst are considered. The importance of the phosphorus beyond its usefulness in providing a stable organic soluble antimony compound is neither suggested nor disclosed.

U.S. Pat. Nos. 4,148,712 (1979) and 4,148,714 (1979) both disclose the use of cracking catalyst fines from a cracking process wherein antimony or a compound thereof had been used as a metals passivation agent for metals such as nickel, vanadium and/or iron. Phosphates, phosphites and thiophosphates of antimony compounds are cited. Oil-soluble antimony tris-(O,O-dihydrocarbyl dithiophosphates) are indicated to be preferred.

U.S. Pat. Nos. 4,153,536 (1979) a divisional of 4,111,845 discloses the use of antimony and antimony-containing compounds to produce a cracking catalyst containing antimony in an amount sufficient to inhibit detrimental effects of metal contaminants such as nickel, vanadium and iron. Organic antimony compounds containing phosphorus atoms such as antimony phosphites, phosphates, thiophosphates and dithiophosphates are mentioned. However, the importance, if any, of the phosphorus alone as a passivating agent itself is neither suggested nor disclosed. The quantity of the antimony to be added to the cracking catalyst is the only feature of the antimony-containing compounds considered. The amount of phosphorus transferred to the cracking catalyst, if any, is not discussed.

U.S. Pat. No. 4,167,471 (1979) discloses a particular method for introducing a passivation stream, e.g., a fluid stream comprising hydrocarbons and an antimony-containing metals passivating agent, at a temperature below the decomposition temperature of such agent, into a cracking zone containing a cracking catalyst so as to maintain said agent substantially free of thermal decomposition until contacting said cracking catalyst. An example of such antimony-containing metals passivating agent cited was disclosed previously in U.S. Pat. No. 4,031,002 (1977) and contained phosphorodithioate ligands attached to antimony.

U.S. Pat. No. 4,169,784 (1979) discloses a method for the simultaneous use of a metals passivation agent and an oxidation promoter in a catalytic cracking system. Antimony compounds are indicated to be preferred for use as the metals passivation agent.

U.S. Pat. No. 4,169,042 (1979) discloses a treating agent for a hydrocarbon cracking catalyst. The adverse effects of nickel, vanadium and iron on cracking catalysts is either precluded or reduced by contacting the cracking catalyst with at least one treating agent selected from the group consisting of elemental tellurium, oxides of tellurium and compounds convertible to elemental tellurium or oxides thereof during cracking or catalyst regeneration. The treating agent can be used either prior to, during or after a cracking catalyst is used in a hydrocarbon conversion process. The manner in which the conventional cracking catalyst is contacted with a modifying agent containing tellurium include solutions of water, hydrocarbon or aqueous acids contacting the cracking catalyst to result in an impregnation followed by volatilization of the liquid or precipitation of tellurium-containing compounds onto the catalyst from a treating solution.

Belgium Application 866,332, corresponding to (McKay) U.S. application Ser. No. 819,027, (now U.S. Pat. No. 4,141,858) discloses the use of antimony and/or bismuth-containing compounds to counteract the deactivating effect of metal contaminants such as nickel, iron and/or vanadium on clay-based cracking catalysts. Bismuth phosphate was expressly cited as an example of a bismuth-containing compound.

U.S. Pat. No. 4,098,678 (Schwartzenbek 1978) discloses a method for overcoming that deactivation of a catalyst which is primarily due to the influence of steam used during hydrocarbon processing. The disclosed invention broadly involves the addition of a silcon-containing compound, for example, silica acid, to steam employed in the cracking operations. Such steam used in the cracking operation is used for dispersing of an oil, stripping of a spent catalyst, airation of a stand pipe and the like. The deactivation due to steam in the hydrocarbon processing is concluded to be attributable to the silica solubilization in the steam which is substantially avoided by the addition of silica-containing compounds to the steam. The additional silica-containing compounds to the steam reduces the rate of silica solubilization from a catalyst into the steam.

U.S. Pat. No. 4,183,803 (1980) discloses a process for the restoration of a used cracking catalyst, an improved catalytic cracking process which can provide a high yield and selectivity for gasoline and a modified cracking catalyst. The improved cracking catalyst involves restoring a used cracking catalyst contaminated by metals selected from the group consisting of nickel, vanadium and iron by contacting the used catalyst with antimony selenide, antimony sulfide, antimony sulfate, bismuth selenide, bismuth sulfide or bismuth phosphate.

The present invention is particulary suitable for passivating poisons in a catalyst utilized in the catalytic cracking of reduced or topped crude oils to more valuable products, such as illustrated in U.S. Pat. Nos. 3,092,568 and 3,164,542, the teachings of which are incorporated by reference herein. Similarly, this invention is applicable to processing shale oils, tar sands oils, coal oils and the like where metal contamination of the processing, e.g., cracking, catalyst can occur.

BRIEF DESCRIPTION OF THE INVENTION

It is an object of this invention to improve the performance of a hydrocarbon conversion catalyst by reducing the poisonous effects of metals present in a hydrocarbon feedstock.

It is an object of this invention to use species of silicon-containing material, alone or in combination with at least one aluminum and/or phosphorus-containing material to reduce the poisonous effects on a chemical conversion catalyst of metal contaminants such as iron, nickel, vanadium and/or copper present in a hydrocarbon feedstock.

Other objects of this invention will be clear based upon this disclosure.

It has been discovered that treating a conversion catalyst containing metal contaminants such as iron, copper, nickel and/or vanadium with at least one silica-containing material and optionally, in combination with an aluminium and/or phosphorus-containing material significantly reduces the poisonous effects of metal contaminants picked up by the catalyst from a hydrocarbon feedstock during hydrocarbon processing. Optionally, but preferably, at least a portion of the hydrocarbon conversion catalyst so treated is calcined before being returned to a hydrocarbon conversion zone. Several methods, to be discussed further hereinafter, for treating such a contaminated conversion catalyst have been found to be surprisingly effective.

One unique aspect of this invention resides in the use of silica-containing material alone or in combination with aluminum and/or phosphorus-containing material to passivate metal contaminants in a catalyst by transfer to the catalyst of at least an effective amount of silicon atoms from the silicon-containing material alone or in combination with aluminum and/or phosphorus-containing atoms from the aluminum and/or phosphorus containing material.

It has also been discovered that treating in the substantial absence of bismuth and/or antimony a conversion catalyst containing a metal contaminant such as iron, copper, nickel and/or vanadium with phosphorus-containing compounds and preferably followed by calcination, the apparent poisonous effects of freshly deposited metal contaminants upon a hydrocarbon conversion catalyst are significantly reduced. The art discussed herein did not appreciate that phosphorus-containing materials or species in the substantial absense of any significant amount of antimony and/or bismuth-containing material can be very effective in reducing the deleterious effects of metal contaminants on a conversion catalyst and thereby to restore to a remarkable degree the catalytic activity of such a treated conversion catalyst. "In the substantial absence of any significant amount of antimony and/or bismuth-containing material or species" is meant that the amount of antimony and/or bismuth present, if any, would alone provide no measurable benefit toward restoring the activity of a poisoned catalyst which is treated in accordance with patents cited herein, i.e., the patents which involve the use of antimony and/or bismuth compounds to passivate metals such as nickel, vanadium and iron in a contaminated cracking catalyst. Several methods, to be discussed hereinafter, for treating such a contaminated catalyst have been found to be surprisingly effective.

We have found that the atomic ratio, i.e., the number of atoms of one specie of atoms, e.g., the total atoms of silicon alone or of phosphorus and/or of aluminum, if any, to that of another specie or species of atoms, e.g., the total number of atoms of metal contaminants to be passivated, is preferably in the range of about 0.01 to about 3, and more preferably in the range of about 0.03 to about 1. Further, it has been discovered that the ratio of all silicon atoms to all phosphorus atoms to be transferred to a metal contaminated catalyst, e.g., a catalyst containing nickel, iron, vanadium and/or copper as contaminants, is preferably in the range of about 0.1:1 to about 10:1, and still more preferably in the range of about 0.5:1 to about 5:1; and that the ratio of all silicon atoms to all aluminum atoms to be transferred to a metal contaminated catalyst, e.g., a catalyst containing nickel, iron, vanadium and/or copper as contaminants is preferably in the range of about 0.1:1 to about 10:1 and still more preferably in the range of about 0.5:1 to about 5:1.

Generally, any silicon, aluminum and/or phosphorus compound which is at least partially soluble or sparingly soluble in a liquid medium used for contacting a regenerated catalyst can be used or which is soluble in the hydrocarbon feed can be used. For a material to be "sparingly soluble" in a liquid medium or solvent means at least 0.01 grams of that material can be dissolved in 100 milliliters of solvent.

Solid oxide catalysts have long been recognized as useful in catalytically promoting the conversion of hydrocarbons. For hydrocarbon cracking processes carried out in the substantial absence of added free molecular hydrogen, suitable catalysts which are usually activated or calcined, are predominately silica or silica-based, e.g., silica-alumina, silica-magnesia, silica-zirconia, etc., compositions in a state of slight hydration containing small amounts of acidic oxide promoters in many instances. The oxide catalyst may contain a substantial amount of a gel or gelatinous precipitate comprising a major portion of silica and at least one other inorganic oxide material, such as alumina, zirconia, etc. These oxides may also contain small amounts of other inorganic materials. The use of wholly or partially synthetic gel or gelatinous catalyst, which are uniform and little damaged by high temperatures in treatment and regenerating, is often preferable.

Also suitable are hydrocarbon cracking catalysts which include a catalytically effective amount of at least one natural or synthetic zeolite, e.g., crystalline alumino silicate. A preferred catalyst is one that includes at least one zeolite to provide a high activity catalyst. Suitable amounts of zeolite in the catalyst are in the range of about 1–75% by weight. Preferred are zeolite amounts of about 2–30% by weight of the total catalyst. Catalysts which can withstand the conditions of both hydrocarbon cracking and catalyst regenerating are suitable for use in the process of this invention. For example, a phosphate silica-alumina silicate composition is shown in U.S. Pat. No. 3,867,279, chrysotile catalysts are shown in U.S. Pat. No. 3,868,316, zeolite beta type of catalyst is shown in U.S. Pat. No. Re. 28,341. The catalyst may be only partially of synthetic material; for example, it may be made by the precipitation of silica-alumina on clay, such as kaolinite or halloysite. One such semi-synthetic catalyst contains about equal amounts of silica-alumina gel and clay.

The manufacture of synthetic gel catalyst is conventional, well known in the art and can be performed, for instance (1) by impregnating silica with aluminia salts; (2) by direct combination of precipitated (or gelated) hydrated alumina and silica in appropriate proportions; or (3) by joint precipitation of alumina and silica from an aqueous solution of aluminum and silicon salts. Synthetic catalyst may be produced by a combination of hydrated silica with other hydrate bases as, for instance, zirconia, etc. These synthetic gel-type catalysts may be activated or calcined before use.

A particularly preferred catalyst contains a catalytically effective amount of a decationized zeolitic molecular sieve having less than 90% of the aluminum atoms associated with cations, a crystalline structure capable of internally absorbing benzene and a $SiO_2$ to $Al_2O_3$ molar ratio greater than 3. Such catalysts are illustrated in U.S. Pat. No. 3,236,761, the teachings of which are incorporated by reference herein.

The physical form of the catalyst is not critical to the present invention and may, for example, vary with the type of manipulative process in which it will be used. The catalyst may be used as a fixed bed or in a circulating system. In a fixed-bed process, a single reaction zone or a series of catalytic reaction zones may be used. If a series of reactors are used, one is usually on stream and others are in the process of cleaning or regenerating and the like. In circulating catalyst systems, such as those of the fluid bed or moving bed catalytic processes, catalyst moves through a reaction zone and then through a regeneration zone. In a fluid bed cracking process, gases are used to convey the catalyst and to keep it in the form of a dense turbulent bed which has no definite upper interface between the dense (solid) phase the suspended (gaseous) phase mixture of catalyst and gas. This type of processing requires the catalyst to be in the form of a fine powder, e.g., a major amount by weight of which being in a size range of about 20 to 150 microns. In other processes, e.g., moving bed catalytic cracking system, the catalyst can be in the form of macrosize particles such as spherical beads which are conveyed between the reaction zone and the catalyst regeneration zone. These beads may range in size up to about ½" in diameter. When fresh, the minimum size bead is preferably about ⅛". Other physical forms of catalyst such as tablets, extruded pellets, etc. can be used.

In this invention, the hydrocarbon petroleum oils utilized as feedstock for a given conversion process may be of any desired type normally utilized in such hydrocarbon conversion operations. The feedstock may contain nickel, iron and/or vanadium as well as other metals. As indicated, the catalyst may be used to promote the desired hydrocarbon conversion by employing at least one fixed bed, moving bed or fluidized bed (dense or dilute phase) of such catalyst. Bottoms from hydrocarbon processes, (i.e., reduced crude and residuum stocks) are particularly highly contaminated with these metals and, therefore, rapidly poison catalysts used in converting bottoms to more valuable products. For example, a bottom may contain about 100–1500 ppm Ni, about 100–2500 ppm V and about 100–3000 ppm Fe. For typical operations, the catalytic cracking of the hydrocarbon feed would often result in a conversion of about 10 to 80% by volume of the feedstock into lower boiling, more valuable products.

Broadly, this invention is an improvement to a conventional conversion process. A conventional conversion process involves contacting a hydrocarbon feedstock in a reaction zone at hydrocarbon conversion conditions with a catalyst to form a conversion product and a deactivated catalyst which has carbonaceous deposits and contains at least a portion of the metal contaminants such as nickel, iron, vanadium and/or copper originally present in the hydrocarbon feedstock. The deactivated catalyst is typically regenerated to restore at least a portion of its catalytic activity by removing under controlled conditions at least a portion of said carbonaceous deposits to form a regenerated catalyst.

An example of a conversion process is cracking of hydrocarbon feedstocks to produce hydrocarbons of preferred octane rating boiling in the gasoline range. A variety of solid oxide catalysts is widely used to give end products of fairly uniform composition. Cracking is ordinarily effected to produce gasoline as the most valuable product and is generally conducted at temperatures of about 750° to 1100° F., preferably about 850° to 950° F., at pressures up to about 2000 psig, preferably about atmospheric to 100 psig and without substantial addition of free hydrogen to the system. In cracking, the feedstock is usually a petroleum hydrocarbon fraction such as straight run or recycle gas oils or other normally liquid hydrocarbons boiling above the gasoline range. Recently, low severity cracking conditions have been employed for heavily contaminated feedstocks such as crude or reduced crude where the conversion is not made directly to the most valuable, lower boiling products, i.e., gasoline boiling range products, but to intermediate type hydrocarbon conversion products which may be later refined to the more desirable, lower boiling, gasoline or fuel oil fractions. High severity cracking has also been practiced for the conversion of such feedstocks to light, normally gaseous hydrocarbons, such as ethane, propane or butane.

An example of a regeneration procedure is one wherein the catalyst is contacted periodically with free oxygen-containing gas in order to restore or maintain the activity of the catalyst by removing at least a portion of the carbonaceous deposits from the catalyst which form during hydrocarbon conversion. However, in those processes not having a regeneration step, the catalyst can be subjected to a regenerating step after the removal of the catalyst from the process. It will be understood that "regeneration" involves a carbonaceous material burn-off procedure. Ordinarily, the catalyst is taken from the hydrocarbon conversion system and treated before the poisoning metals have reached an undesirably high level, for instance, above about 0.5% by weight, on catalyst and preferably less than about 10% maximum, content of nickel, iron and vanadium. More preferably, the catalyst is removed when the nickel, iron and vanadium content is less than about 5% by weight and most preferably when the catalyst contains about 0.75% to about 2% by weight nickel, iron and vanadium. Generally speaking, when the hydrocarbon conversion levels, i.e., more than about 50% by volume (of the feedstock) conversion, the amount of metals tolerated on the catalyst is less. On the other hand, low conversion levels, i.e., less than about 50% by volume conversion, tolerate higher amounts of metals on the catalyst.

The actual time or extent of the regeneration thus depends on various factors and is dependent on, for example, the extent of metals content in the feed, the level of conversion, unit tolerance for poison, the sensitivity of the particular catalyst toward the passivation procedure used to reduce the poisonous effects of metals upon the catalyst, etc.

Regeneration of a hydrocarbon cracking catalyst to remove carbonaceous deposit material is conventional and well known in the art. For example, in a typical fluidized bed cracking unit, a portion of catalyst is continually being removed from the reactor and sent to the regenerator for contact with an oxygen-containing gas at about 950° to about 1220° F., preferably about 1000° to about 1150° F. Combustion of carbonaceous deposits from the catalyst is rapid, and, for reasons of economy, air is used to supply the needed oxygen. Average residence time for a catalyst particle in the regenerator can be on the order of about three to one hundred minutes, preferably about three minutes to sixty minutes and the oxygen content of the effluent gases from the regenerator is desirably less than about 0.5 weight percent. When later oxygen treatment is employed, the regeneration of any particular quantity of catalyst is generally regulated to give a carbon content remaining on the catalyst of less than about 0.5 weight percent. At least a portion of the regenerated catalyst is then returned to the reaction zone.

Calcination of a hydrocarbon cracking catalyst involves heating at high temperatures, e.g., 950° to 1200° F., in a molecular oxygen-containing gas. The temperature preferably is at least about 50° F. higher than the regeneration temperature, but below a temperature where the catalyst undergoes any substantial deleterious change in its physical or chemical characteristics. The catalyst is in a substantially carbon-free condition during a calcination treatment, because the burning off of any significant amount of carbon on the catalyst would lead to, at least in the area where such carbon was located, the evolution of such amounts of heat energy that the catalyst near such evolution of heat energy would very likely be damaged.

The improved process of this invention comprises: contacting a regenerated catalyst with a liquid medium containing an effective amount, to be discussed in more detail hereinafter, of one or more silicon-containing materials alone or in combination with aluminum and/or phosphorus-containing materials, all of which are at least in part soluble within said liquid medium, to form a treated catalyst and optionally, but preferably, separating the treated catalyst from at least a portion of said liquid medium and transferring at least a portion of the treated catalyst to said reaction zone.

The transfer of treated catalyst to the reaction zone is intended to include both direct and/or indirect transfer to the reaction zone. For example, the treated catalyst can be returned to the regenerator, or a zone for calcination, or to the hydrocarbon feedstock before, after or substantially simultaneously as that feedstock is being introduced into the reaction zone.

The time of contacting is sufficient to permit a sufficient amount of the silicon-containing material alone or in combination with aluminum and/or phosphorus-containing material to react with the regenerated catalyst to form a treated catalyst. The order of contacting the regenerated catalyst with silicon, phosphorus and/or aluminum-containing material or species has been found to be generally unimportant. The contacting with silicon and phosphorous-containing species may be alternately in the same or different liquid mediums, first silicon then phosphorus-containing species, or vice versa, or substantially simultaneously from a single liquid medium containing both species. The same is true for silicon and alumina.

The effective amount of silicon, aluminum and/or phosphorus-containing materials or species present in the liquid medium cannot be precisely defined, but it is preferably an amount which results in the treated catalyst having an atomic ratio of silicon, aluminum and/or phosphorus atoms from all silicon, aluminum and/or phosphorus-containing species, to total number of atoms of metal contaminants, e.g., of unpassivated nickel, vanadium, iron and/or copper in the treated catalyst in the range of about 0.01 to about 3, and preferably in the range of about 0.03 to about 1. Atomic ratio of a first material or specie of atoms to a second material or specie of atoms means, throughout this specification and claims, the ratio of the total number of atoms of the first material or specie, regardless of any oxidation state or states therein, to the total number of atoms of the second specie, regardless of any oxidation state or states therein.

For example, when the concentration of contaminating metals, calculated as a respective element thereof, in the catalyst is within the range of about 0.2% to about 3.5% by weight, as based upon the total weight of the catalyst, a particularly useful liquid, e.g., water, medium concentration in moles/liter of silicon, aluminum and/or phosphorus-containing species, calculated as based on the respective element of the specie present, is in the range of about 0.03 mole/liter to about 1.0 mole/liter. The percent by weight of catalyst in such a liquid medium is not critical, but is preferably in the range of about 10 to 40 percent by weight.

The liquid medium referred to above can be either an aqueous medium or an organic medium. Both the aqueous medium and the organic medium should be substantially free from contaminating metals such as discussed earlier. The terms "substantially free", means throughout this specification and claims, present in a concentration sufficiently low so as not to contaminate a catalyst treated by such a medium to a degree that measurably and adversely degrades the selectivity and/or activity of the catalyst so treated. Example of such aqueous media are distilled water and deionized water. Examples of suitable organic media are petroleum distillates, liquid hydrocarbons, such as benzene, toluene, naphthenes and the like.

Examples of suitable silicon compounds which are particularly effective in an aqueous medium treatment of a conversion catalyst are: colloidal $SiO_2$; silanes having the general formula $Si_nH_{2n+2}$ where n is an integer in the range of from 1 to 10; siloxanes having the general formula $H_3Si(OSiH_2)_nOSiH_3$ where n is an integer in the range of from 0 to 10; $Si(Ac)_4$; $H_4SiO_3$; $M_2SiO_3$, and $M_4SiO_4$ where M is a monovalent metal ion selected from the group consisting of group 1a of the Periodic Table of elements. Ac means an acetate anion throughout this specification. Colloidal $SiO_2$ is commercially available and consists of particles of $SiO_2$ having dimensions in the range of about 0.001 micron to about 1 micron. Ultrafine grinding can be used to prepare a colloidal dispersion of $SiO_2$.

Examples of suitable silicon compounds which are particularly effective in an organic medium treatment of a conversion catalyst are: silanes having the general formula $Si_nH_{2n+2}$ wherein n is an integer in the range from 1 to 10; siloxanes having the general formula $H_3Si(OSiH_2)_nOSiH_3$ wherein n is an integer in the range of from 1 to 10; $Si(A)_4$ wherein A is selected from the group of carboxylic acids containing up to four carbon atoms; a compound having a formula selected from the group consisting of: $Si(OR)_4$ and $(RO)_3SiOSi(R)_3$ wherein each R is individually selected from the group consisting of compounds containing only carbon and hydrogen atoms, i.e., a hydrocarbyl material wherein the number of carbon atoms is in the range of from 1 to 20, a halogen substituted hydrocarbyl material, i.e., a material, wherein at least one hydrogen of a hydrocarbyl material has been replaced by a halogen selected from the group consisting of fluorine, chlorine, bromine and iodine; a cyclosilane compound having a general formula $(SiH_2)_n$ wherein n is an integer in the range 2 to 5; a cyclosiloxane compound having a general formula $(SiH_2.O)_n$ wherein n is an integer in the range of from 3 to 10; a silazane having a general formula $H_3Si(NHSiH_2)nNHSiH_3$ wherein n is an integer in the range of from 0 to 10; a cyclosilazane having a general formula $(SiH_2.NH)_n$ wherein n is an integer in the range of from 2 to 15; a compound having a general formula selected from the group consisting: $R_nSiH_{4-n}$, and $R_nSi(OH)_{4-n}$ wherein n is an integer in the range of 1 to 4 and wherein each R is individually selected from the group consisting of a hydrocarbyl material having up to 20 carbon atoms and a halogen substituted hydrocarbyl material having up to 20 carbon atoms wherein said halogen is selected from the group consisting of fluorine, chlorine, bromine and iodine; a compound having a general formula selected from the group consisting of: $(RO)_nSiH_{4-n}$ and $(RO)_nSi(OH)_{4-n}$ wherein each R is individually selected from the group consisting of a hydrocarbyl material having up to 20 carbon atoms and a halogen substituted hydrocarbyl material having up to 20 carbon atoms wherein said halogen is selected from the group consisting of fluorine, chlorine, bromine and iodine and wherein n is an integer in the range of from 1 to 4; a compound having a general formula $SiSX_2$ wherin each X is individually selected from the group consisting of bromine and chlorine and S is sulfur; a hexahalodisiloxane having the general formula $Si_2OX_6$ wherein each X is individually selected from the group of halogens consisting of fluorine, chlorine, bromine and iodine; and a compound having a formula selected from the group consisting of: $((RO)_3Si)_2O$, $(R_3Si)_2O$ and $(R_3Si)_2S$ wherein S is sulfur and each R of said compound is selected from the group consisting of hydrogen, a hydrocarbyl material having up to 5 carbon atoms and a halogen substituted hydrocarbyl material having up to 5 carbon atoms; a compound having the general formula $((RO)_3Si)_2O$ wherein each R is individually selected from the group consisting of a hydrocarbyl material having up to 5 carbon atoms and of a halogen substituted hydrocarbyl materials having up to 5 carbon atoms; and a compound having a formula selected from the group consisting of $(RO)_nSi(OH)_{4-n}$ and $(R)_nSi(OH)_{4-n}$ wherein each R is individually selected from the group consisting of a hydrocarbyl material having up to 5 carbon atoms and of a halogen substituted hydrocarbyl material having up to 5 carbon atoms and wherein n is an integer in the range of 1 to 3.

Examples of suitable aluminum compounds which have been found particularly effective in an aqueous solution treatment of conversion catalyst are: $Al(NO_3)_3$, $Al_2(SO_4)_3$, $AlPO_4$, $Al(C_6H_5O)_3$, $Al(Ac)_3$, wherein Ac is acetate, $(NH_4Al(SO_4))_2$, $(Al(BrO_3))_3$, $Al(ClO_3)_3$, $Al(C_2H_5O)_3$, Al-lactate, Al-oleate and $AlX_3$ wherein each X is individually selected from the group of halogens consisting of F, Cl, Br and I.

Generally, any aluminum compound which is at least partially soluble or sparingly soluble in an organic medium can be used to contact a regenerated catalyst or which is soluble or sparingly soluble in the hydrocarbon feed can be used. For a material to be sparingly soluble in a solvent means at least 0.01 grams of that material can be dissolved in 100 milliliters of solvent. Some examples of organic compounds that can be used are: diketonates; sulfonates; dithiophosphates; alkoxides; carboxylates having from 1 to 20 carbon atoms; such as stearates and oleates; phenoxides; naphthenates; aluminum hydrocarbyls; such as alkyls having the formula $R_3Al$ wherein each R individually contains from 1 to 20 carbon atoms; hydrocarbyl aluminum halides having the formula $R_nAlX_{3-n}$ wherein n can have values of 1 or 2 and each R is individually selected from a group consisting of hydrocarbyl and halogen substituted hydrocarbyl material having up to 20 carbon atoms wherein the halogen is individually selected from fluorine, chlorine, bromine and iodine; alkylalkoxyaluminum having the formula $R_nAl(R'O)_{3-n}$ wherein each R and R' individually is selected from a group consisting of hydrocarbyl and halogen substituted hydrocarbyl materials having from 1 to 20 carbon atoms and wherein n is an integer in the range of from 0 to 3; carbonyls, metallocenes, hydrocarbyl, such as alkyl and aryl phosphine and phosphite complexes wherein the hydrocarbyl has 1 to 20 carbon atoms; aluminum oxalates; aluminum acetates; aluminum diethylmalonate; aluminum 1-phenolsulfonates and aluminum halides wherein the halide is selected from a group of halides consisting of fluorine, chlorine, bromine, iodine and mixtures thereof.

Examples of suitable phosphorus compounds which are particularly effective in an aqueous solution treatment of a conversion catalyst are: $P_2O_5$, $H_3PO_4$, $(NH_4)_3PO_4$, $(NH_4)_2HPO_4$, $(NH_4)H_2PO_4$, $H_4P_2O_7$, $PSBr_3$, $H_3PO_2$, $H_3PO_3$, $(NH_4)_2H_2P_2O_7$ and phosphorylamide $(PO(NH_2)_3)$.

Examples of suitable phosphorus compounds which are particularly effective in an organic medium are: $R_3P$, $(RO)_3P$, $(RO)_3PO$ and $R_3PO$ where each R of the preceding four formulas is individually selected from the group consisting of compounds containing only carbon and hydrogen such as alkyl, aralkyl, alkenyl, aralkenyl, i.e., a hydrocarbyl material, having from 1 to 35 carbon atoms and a halogen substituted hydrocarbyl material having from 1 to 35 carbon atoms wherein at least one hydrogen of said hydrocarbyl materia is replaced with a halogen selected from a group consisting of fluorine, chlorine, bromine and iodine; $POX_3$, $PSX_3$, $PX_5$ and $PX_3$ where each X of the preceding four formulas is individually selected from the group consisting of fluorine, chlorine, bromine and iodine; $P_4S_7$, $P_2S_5$, $P_4S_4$, $P_4O_6S_4P(SCN)_3$, $(PNCl)_x$ where x can be 2 or 3, $P_4$, $P_2O_3$, $H_3PO_3$ and $H_3PO_2$. In the preceding formulas and wherever used throughout this specification: P is phosphorus; O is oxygen; S is sulfur; N is nitrogen; and Cl is chlorine.

In still another method for passivating the poisonous effects of metal contaminants on a conversion catalyst is to introduce into the hydrocarbon feed of a conventional conversion process at least one partially soluble silicon-containing material or compound alone or in combination with phosphorus and/or aluminum-containing material before, after or simultaneously with contacting the catalyst in a reaction zone with that hydrocarbon feed In this method there is no need to separately calcine the catalyst as the substantially simultaneous deposition of both the silicon-containing material alone or in combination with phosphorus-containing and/or aluminum-containing material and other metal contaminants within the hydrocarbon feedstock have been found to surprisingly work together to maintain the activity of the conversion catalyst. The atomic ratio of all silicon, phosphorus and/or aluminum atoms to all metal contaminants in the hydrocarbon feed has an impact upon the observed results. For example, if the ratio is much in excess of 3, then the catalytic activity of the catalyst may be adversely effected. If, on the other hand, the ratio is much less than about 0.01, then the observed benefits are correspondingly lessened. Generally, some benefits of this invention are obtained when the atomic ratio of all silicon, phosphorus and/or aluminum to all metal contaminants in the hydrocarbon feed is in the range of about 0.01 to about 3, and preferably when the ratio is in the range of about 0.03 to about 1.

Examples of processing conditions useful in carrying out a process of this invention are set out hereinafter. Contacting times between a catalyst and a liquid medium for aqueous media are generally in the range of from about half a second to about twenty minutes and preferably in the range of from about two minutes to about ten minutes. Contacting times for an organic medium is about the same as for an aqueous medium, but often depends upon the rate at which the organic medium can be evaporated off, and hence does not have a simply definable contacting time. The temperature of the contacting medium, e.g., organic and aqueous media, can be any where from about ambient or room temperature (72° F.) to the boiling point of the contacting medium. Temperature is not critical and may, in fact, be below room temperature, but we have found no reason for cooling in order to obtain the benefits from a process of this invention.

It has further been found that contact with oxidative washes, i.e., an aqueous solution containing an oxidizing agent or an agent capable of accepting electrons, has a beneficial effect of further improving the catalytic activity of a silicon, phosphorus and/or aluminum treated or passivated conversion catalyst which contains metal contaminants. The "wash" refers to a treatment which may be carried out in a variety of ways, e.g., batch operation, semi-continuous or continuous operation with or without counter currents. The passivated catalyst is contacted with the oxidative or wash solution for a time sufficient to cause an interaction between the solution and catalyst that results in a measurable benefit. The amount of metal contaminants removed from the conversion catalyst by these oxidative washes is generally very small and apparently works by a mechanism different from that of a demetallization process such as disclosed in U.S. Pat. Nos. 4,102,811 (1978); 4,163,709 (1979), and 4,163,710 (1979), which patents are expressly incorporated herein by reference.

A preferred oxidative wash medium comprises a solution of hydrogen peroxide in water. Other oxidizing agents which may be used include air, oxygen, ozone, perchlorates, organic hydroperoxides, organic peroxides, organic peracids, inorganic peroxyacids such as peroxymonosulfuric and peroxydisulfuric acid, singlet oxygen, $NO_2$, $N_2O_4$, $N_2O_3$, superoxides and the like. Typical examples of organic oxidants are hydroxyheptyl peroxide, cyclohexanone peroxide, tertiary butyl peracetate, di-tertiary butyl diperphthalate, tertiary butyl perbenzoate, methyl ethyl hydroperoxide, di-tertiary butyl peroxide, p-methyl benzene hydroperoxide, naphthylhydroperoxide, tertiary butyl hydroperoxide, pinane hydroperoxide, 2,5-dimethylhexane-2,5-dihydroperoxide, cumene hydroperoxide and the like; as well as organic peracids such as performic acid, peracetic acid, trichloroperacetic acid, perchloric acid, periodic acid, perbenzoic acid, perphthalic acid and the like including salts thereof. Ambient oxidative wash temperatures can be used, but temperatures of about 150° F. to the boiling point of the aqueous solution in combination with agitation are helpful. Preferred temperatures are about 150° F. to about 203° F.

The hydrogen peroxide solution preferably containing about 2 to 30 weight % hydrogen peroxide, can be added to an queous catalyst slurry as described earlier at about 150°–203° F., more preferably 140°–185° F. and allowed to react for a time sufficient to produce a useful result. Preferred wash times are about 1–5 minutes. A concentration of $H_2O_2$ in the range of about 5–50 lb., preferably about 10–20 lb. of $H_2O_2$/ton of catalyst is preferably used. Additional oxidative washes can be used to ensure the restoration of catalytic properties. In addition, the oxidative washing can be carried out either in the presence of or absence of a mineral acid such as HCl, $HNO_3$ or $H_2SO_4$. Preferably the pH of the oxidative wash medium is about 3 to about 6.

After the catalyst is washed, the catalyst slurry can be filtered to give a cake. The cake may optionally be reslurried one or more times with water or rinsed in other ways, such as, for example, by a water wash of the filter cake.

After the washing and rinsing treatment, the catalyst is transferred to a hydrocarbon conversion system, for instance, to a catalyst regenerator. The catalyst may be returned as a slurry in the final aqueous wash medium, or it may be desirable first to dry the catalyst filter cake or filter cake slurry at, for example, about 215° to 320° F., under a vacuum, e.g., of less than one atmosphere. Also, prior to reusing the catalyst in the conversion operation it can be calcined, for example, at temperatures usually in the range of about 700° F. to about 1300° F. The catalyst may also be slurried with hydrocarbons and added back to the reactor vessel, if desired.

The following examples are intended to be illustrative of the invention of this disclosure. However, many variations based on the teachings of this disclosure are readily apparent to one skilled in the art and are intended to be within the scope of this invention. The examples should not be used to unnecessarily restrict the nature and scope of this invention.

EXAMPLE I

A Phillips Borger equilibrium silica-alumina zeolite-containing catalyst is used. This catalyst includes about 5% by weight of a crystalline aluminum silicate effective to promote hydrocarbon cracking having an initial catalytic activity as follows:

|  | Catalytic Activity | | |
| --- | --- | --- | --- |
|  | MA | CPR | $H_2/CH_4$ |
| Original Catalyst | 80 | 0.75 | 8.0 |

The catalyst was used in a fluid catalytic cracking conversion of a hydrocarbon feedstock containing iron, nickel, copper, and vanadium. The contaminated catalyst was removed from the hydrocarbon conversion stream and regenerated to remove carbon under conventional regeneration conditions, so as to have less than about 0.5% by weight of carbon. The regenerated catalyst had a catalytic activity, surface area (meters squared per gram), and a metal contamination shown in the following:

| % Metal Contaminants | | | Catalytic Activity | | | *Surface Area | |
| --- | --- | --- | --- | --- | --- | --- | --- |
| Ni | Fe | V | MA | CPF | $H_2/CH_4$ | Total | Zeolite |
| 0.33 | 0.72 | 0.71 | 59.1 | 3.02 | 20.0 | 99 | 22 |

*Areas in meters squared per gram were determined in the case of total area following ASTM D 3663 (1978) which involved an adsorption-desorption as in the BET method and in the case of the area attributable to zeolite following a procedure disclosed by M. F. L. Johnson in The Journal of Catalysis, 1978, V. 52, pg. 425.

The regenerated catalyst was treated with a mixed solution of silicon tetraethoxide, $(C_2H_5O)_4Si$, and aluminum isopropoxide, $Al(iPrO)_3$, in chloroform under reflux conditions for twenty minutes. The atomic ratios of Si and Al to total metal contaminants on the catalyst in the mixed solution were 2.0:1 (Si:metal) and 1–0:1.0 (Al:metal). The solvent was evaporated off to harvest solid treated catalyst, dried at 220° F. under vacuum and an oxidative wash with $H_2O_2$ was repeated twice. Calcination of the product at 1000° F. for 4 hours was followed to obtain the final treated catalyst. Detailed results are summarized in TABLE 1. The final catalyst treated in this manner exhibited unusually high catalytic activities, which are also reflected by an increase in total surface area from 99 m²/g (for untreated catalyst) to 110 m²/g.

TABLE 1

Passivation of Metal Poisoned FCC Catalyst
Feed Catalyst: Phillips Borger Equilibrium Catalyst
Passivating Agent: $(EtO)_4Si + Al(iPrO)_3$

|  | % Metal |  |  |  | Catalyst Activity |  |  | Surface Area |
|---|---|---|---|---|---|---|---|---|
|  | Ni | Fe | V | Ce | MA | CPF | $H_2/CH_4$ |  |
| Contaminated Catalyst | 0.33 | 0.72 | 0.71 | 0.10 | 59.1 | 3.01 | 20.2 | 99 |
| Treated Catalyst | 0.30 | 0.67 | 0.54 | 0.10 | 74.1 | 1.33 | 3.92 | 110 |

EXAMPLE II

A regenerated metal contaminated catalyst as disclosed in EXAMPLE I was allowed to react with an aqueous silica colloidal solution at room temperature under agitation for about 30 minutes. The catalyst (20 g.) was slurried in 80 ml containing 9.6 grams colloidal silica solution (7.5 weight % $SiO_2$) and the passivation procedure was carried out as described above. During this period the turbid $SiO_2$ colloidal solution became clear due to deposition of $SiO_2$ on the catalyst surface. The catalyst was filtered, a clear filtrate discarded, and the catalyst so separated was dried under vacuum at 220° F. for 6 hours. The dried catalyst was then washed with a dilute solution of $H_2O_2$ (20#$H_2O_2$/ton catalyst) at 160° F. for 4 minutes. The same wash procedure was repeated in the 20% catalyst slurry system. Catalytic activities of the final catalyst are summarized in entry 1 of TABLE 2. In the oxidative wash step with $H_2O_2$, some vanadium, 25% including 8% removal in the silica treating stage, was achieved, but both nickel and iron concentrations were substantially unchanged. However, remarkable improvements in the catalytic performance were noted in the silica treating step (entry 1.a., TABLE 2), and further improvement was accomplished in the following $H_2O_2$ wash (entry 1.b., TABLE 2).

EXAMPLE III

Twenty grams of the same Phillip's Borger catalyst of EXAMPLE II was allowed to react under reflux conditions in a silica tetraethoxide solution wherein 1.20 grams of silica tetraethoxide, $Si(C_2H_5O)_4$, was dissolved in 80 ml of chloroform. After reaction was carried out for 15 minutes with vigorous agitation at ambient temperature (72° F.), chloroform was evaporated off the system to obtain a solid catalyst. The catalyst obtained in this way was dried in a vacuum oven at 210° F. for 10 hours, and followed by calcination of the dried catalyst at 1100° F. for 4 hours. An oxidative wash of $H_2O_2$ was achieved by the same procedure used in EXAMPLE II. Results are listed in entry 2, TABLE 2. An unexpectedly high level of the catalytic activity of the final treated catalyst was reflected by the increase in the surface areas. The atomic ratio of Si to total metal on the equilibrium catalyst was 2:1 in this experiment.

TABLE 2

Passivation of Metal Poisoned FCC Catalyst
Feed Catalyst: Phillip's Borger Equilibrium Catalyst
Passivating Agent: Silica Deposition

|  | % Metal |  |  |  | Cat. Activity |  |  | Total | Zeolitic M²/g |
|---|---|---|---|---|---|---|---|---|---|
|  | Ni | Fe | V | Ce | MA | CPF | $H_2/CH_4$ |  |  |
| Contaminated Catalyst | 0.33 | 0.72 | 0.71 | 0.10 | 59.1 | 3.01 | 20.2 | 99 | 22 |
| 1. a. Colloidal $SiO_2$ (7.5 wt %) deposit, dried. | 0.32 | 0.73 | 0.65 | 0.10 | 65.6 | 2.33 | 10.70 | — | — |
| b. $H_2O_2$ wash | 0.33 | 0.72 | 0.53 | 0.10 | 72.1 | 1.54 | 7.11 | — | — |
| 2. $(EtO)_4Si$ (2 Si/metal) reflux in $CHCl_3$, dried, and calcined at 1100° F., 4 hr. $H_2O_2$ wash followed. | 0.31 | 0.67 | 0.54 | 0.11 | 70.5 | 1.17 | 5.72 | 105 | 31 |

EXAMPLE IV

Twenty grams of the regenerated Phillip's Borger catalyst of EXAMPLE 1, after first being water washed, was slurried at room temperature (72° F.) in a triphenylphosphite solution in chloroform. Wherein 2.90 grams of triphenylphosphite, $(C_6H_5O)_3P$ was dissolved in 10 ml of chloroform. The resulting slurry system was allowed to react for 20 minutes. The atomic ratio of P to total metal was adjusted to be 1.5:1. The solvent was then evaporated off to obtain a treated solid catalyst. It was dried at 240° F. in a vacuum oven for 14 hours, and calcined at 1100° F. for 4 hours. The resultant catalyst was further treated with colloidal silica (5 weight % based on the catalyst) in an aqueous solution. The slurried mixed system was stirred at room temperature for 30 minutes. The catalyst was then filtered and washed with $H_2O_2$ (20#$H_2O_2$/ton catalyst). A 20 weight % catalyst slurry in water was allowed to react with $H_2O_2$ at 160° F. for about 4 minutes. After the liquid portion was decanted off, the same wash procedure was repeated again. The finished catalyst was filtered, dried and calcined at 1100° F. for 4 hours. Metal removals and catalytic activities of the two steps described above are summarized in entries 1.a. and 1.b. in TABLE 3.

EXAMPLE V

The regenerated Phillip's Borger equilibrium catalyst of EXAMPLE 1 (20 grams) was allowed to react in a triphenylphosphite solution in chloroform, 3.86 g. $(C_6H_5O)_3P$ in 80 ml chloroform, under reflux conditions for 15 minutes. The chloroform solvent was evaporated off and the resulting catalyst was further treated in an organic solution of silicon tetraethoxide, 2.40 grams of $Si(C_2H_5O)_4$ dissolved in 60 ml chloroform, under reflux for 15 minutes. The solvent was evaporated off again, dried and calcined at 1100° F. for 4 hours. The atomic ratio of P:Si:total metal was adjusted to be 2:2:1 in this example. Results of the final treated catalyst are listed in entry 2, TABLE 3.

EXAMPLE VI

The water washed Phillip's Borger equilibrium catalyst described in EXAMPLE I, was allowed to react with triphenylphosphite under reflux conditions for 15 minutes. 40 grams of the water-washed and dried catalyst was added to 120 ml of a triphenylphosphite solution in $CHCl_3$, 1.93 grams of $(C_6H_5O)_3P$ in 120 ml of $CHCl_3$. The atomic ratio of P to total metal contaminants was adjusted to be 0.5:1 in the reaction. The solid catalyst was obtained by evaporating off the solvent, and the treated catalyst was divided into two equal parts. The first part was dried, calcined at 1100° F. for 4 hours. The calcined catalyst was washed with an aqueous hydrogen peroxide as described in previous examples. The remaining half of the catalyst from the phosphite treating step was further reacted with a chloroform solution of silicon tetraethoxide, 0.97 gram $Si(C_2H_5O)_4$ in 80 ml chloroform, under reflux for 15 minutes. The atomic ratio of Si to total metal contaminants was 0.5:1. The solvent was removed by evaporation, the resulting catalyst was dried, calcined and an oxidative wash with an aqueous $H_2O_2$, as in previous examples, was finally applied. Metal removals and catalytic activities were summarized in TABLE 3 as entries 3.a. and 3.b. for catalysts obtained from the above two treatments.

TABLE 3

Passivation of Metal Poisoned FCC Catalyst
Feed Catalyst: Phillip's Borger Equilibrium Catalyst 002328
Passivating Agent: $(\phi O)_3P + (EtO)_4Si$ or $SiO_2$

| No. | Treating Conditions | % Metal | | | | Cat. Activity | | |
|---|---|---|---|---|---|---|---|---|
| | | Ni | Fe | V | Ce | MA | CPF | $H_2/CH_4$ |
| | Contaminated Catalyst | 0.33 | 0.72 | 0.71 | 0.10 | 59.1 | 3.02 | 20.20 |
| 1. | a. Water washed Cat. $(\phi O)_3P$ (1.5P/metal) dried and calcd at 1100° F., 4 hr. | 0.32 | 0.72 | 0.59 | 0.10 | 52.0 | 1.54 | 8.48 |
| | b. Colloidal silica (5wt%) on #43122 $H_2O_2$ wash followed. | 0.30 | 0.71 | 0.48 | 0.10 | 65.1 | 0.73 | 5.47 |
| 2. | $(\phi O)_3P(2P/metal)$ plus $(EtO)_4Si(2Si/metal)$, dried and calcd at 1100° F., 4 hr. | 0.32 | 0.70 | 0.53 (P: 0.69% on the catalyst) | 0.10 | 68.7 | 0.85 | 4.56 |
| 3. | a. Water washed Cat. $(\phi O)_3P$ (0.5P/metal) dried, calcd, $H_2O_2$ wash | 0.33 | 0.72 | 0.51 (P: 0.46% on the catalyst) | 0.10 | 70.2 | 1.04 | 5.16 |
| | b. Further treat with $Si(C_2H_5O)_4$(0.5 Si/metal) dried, calcd and $H_2O_2$ wash | 0.33 | 0.72 | 0.50 | 0.10 | 71.0 | 0.95 | 4.91 |

The embodiments of this invention in which an exclusive property or privilege is claimed are defined as follows:

1. In a process for converting a hydrocarbon material having at least one metal contaminant selected from the group consisting of nickel, vanadium, iron and copper which comprises contacting the hydrocarbon material in a reaction zone at hydrocarbon conversion conditions with a catalyst to form a conversion product and a deactivated catalyst having carbonaceous deposits and containing at least a portion of said metal contaminant, and regenerating at least a portion of said deactivated catalyst to restore at least a portion of the catalyst activity by removing at least a portion of said carbonaceous deposits to form a regenerated catalyst, the improvement which comprises: contacting at least a portion of said regenerated catalyst with a liquid medium containing an effective amount of at least one silicon-containing material for passivating at least a portion of said at least one metal contaminant for a time sufficient to permit at least a portion of said silicon-containing material to interact with said portion of said regenerated catalyst to form a treated catalyst containing silicon atoms from said silicon-containing material, contacting at least a portion of said treated catalyst with an oxidative wash to form a washed catalyst, and transferring at least a portion of said washed catalyst to said reaction zone.

2. The improved process of claim 1 wherein the liquid medium is water substantially free from contaminating metals.

3. The improved process of claim 1 wherein the liquid medium is an organic medium capable of dissolving at least a portion of said at least one silicon-containing material.

4. The improved process of claim 1 wherein said oxidative wash comprises a peroxide.

5. The improved process of claim 4 wherein said peroxide is hydrogen peroxide which is present at a concentration in a range of about five to about fifty pounds of peroxide per ton of treated catalyst contacted.

6. The improved process of claims 2 or 3 wherein the atomic ratio of said silicon atoms from said at least one silicon-containing material to total atoms from said metal contaminant contained in said treated catalyst is in the range of about 0.01:1 to about 3:1.

7. The improved process of claims 2 or 3 wherein said effective amount of said at least one silicon-containing material is such that an atomic ratio of all silicon atoms in said liquid medium transferred to said treated catalyst to all atoms of said metal contaminants in said treated catalyst is in the range of about 0.01:1 to about 3:1.

8. The improved process of claims 2 or 3 wherein at least a portion of said treated catalyst is calcined prior to being transferred to said reaction zone.

9. In the improved process of claim 1 wherein the effective amount of said silicon, calculated as atomic silicon, in moles per liter of said liquid medium is in the range of about 0.03 to about 1 when the concentration of metal contaminants, calculated as its respective element, in the deactivated catalyst is in the range of about 0.2% by weight to about 3.5% by weight, as based upon the total weight of the catalyst.

10. The improved process of claim 2 wherein said at least one silicon-containing material is selected from the group consisting of: colloidal $SiO_2$; silanes having the general formula $Si_nH_{2n+2}$ wherein n is an integer in the range of from 1 to 10; siloxanes having the general formula $H_3Si(OSiH_2)_nOSiH_3$ wherein n is an integer in the range of from 0 to 10; $Si(Ac)_4$; $H_4SiO_3$; $M_2SiO_3$ and $M_4SiO_4$ wherein M is a monovalent metal ion selected from the group consisting of group 1a of the Periodic Table of Elements.

11. The improved process of claim 3 wherein said at least one silicon-containing material is selected from the group consisting of: colloidal $SiO_2$; silanes having the general formula $Si_nH_{2n+2}$ wherein n is an integer in the range from 1 to 10; siloxanes having the general formula $H_3Si(OSiH_2)_nOSiH_3$ wherein n is an integer in the range of from 1 to 10; $Si(A)_4$ wherein A is selected from the group of carboxylic acids containing up to four carbon atoms; a compound having a formula selected from the group consisting of: $Si(OR)_4$ and $(RO)_3SiOSi(R)_3$ wherein each R is individually selected from the group consisting of a hydrocarbyl material wherein the number of carbon atoms is in the range of from 1 to 20, a halogen substituted hydrocarbyl material wherein at least one hydrogen of a hydrocarbyl material has been replaced by a halogen selected from the group consisting of fluorine, chlorine, bromine and iodine; a cyclosilane compound having a general formula $(SiH_2)_n$ wherein n is an integer in the range 2 to 5; a cyclosiloxane compound having a general formula $(SiH_2.O)_n$ wherein n is an integer in the range of from 3 to 10; a silazane having a general formula $H_3Si(NHSiH_2)nNHSiH_3$ wherein n is an integer in the range of from 0 to 10; a cyclosilazane having a general formula $(SiH_2.NH)_n$ wherein n is an integer in the range of from 2 to 15; a compound having a general formula selected from the group consisting: $R_nSiH_{4-n}$, and $R_nSi(OH)_{4-n}$ wherein n is an integer in the range of from 1 to 4 and wherein each R is individually selected from the group consisting of a hydrocarbyl material having up to 20 carbon atoms and a halogen substituted hydrocarbyl material having up to 20 carbon atoms wherein said halogen is selected from the group consisting of fluorine, chlorine, bromine and iodine; a compound having a general formula selected from the group consisting of: $(RO)_nSiH_{4-n}$ and $(RO)_nSi(OH)_{4-n}$ wherein each R is individually selected from the group consisting of a hydrocarbyl material having up to 20 carbon atoms and a halogen substituted hydrocarbyl material having up to 20 carbon atoms wherein said halogen is selected from the group consisting of fluorine, chlorine, bromine and iodine and wherein n is an integer in the range of from 1 to 4; a compound having a general formula $SiSX_2$ wherein each X is individually selected from the group consisting of bromine and chlorine; a hexahalodisiloxane having the general formula $Si_2OX_6$ wherein each X is individually selected from the group of halogens consisting of fluorine, chlorine, bromine and iodine; and a compound having a formula selected from the group consisting of: $((RO)_3Si)_2O$, $(R_3Si)_2O$ and $(R_3Si)_2S$ wherein and each R of said compound is selected from the group consisting of hydrogen, a hydrocarbyl material having up to 5 carbon atoms and a halogen substituted hydrocarbyl material having up to 5 carbon atoms; a compound having the general formula $((RO)_3Si)_2O$ wherein each R is individually selected from the group consisting of a hydrocarbyl material having up to 5 carbon atoms and of a halogen substituted hydrocarbyl materials having up to 5 carbon atoms; and a compound having a formula selected from the group consisting of $(RO)_nSi(OH)_{4-n}$ and $(R)_nSi(OH)_{4-n}$ wherein n is an integer in the range of 1 to 3 and wherein each R is individually selected from a group consisting of a hydrocarbyl material having up to 5 carbon atoms and of a halogen substituted hydrocarbyl material having up to 5 carbon atoms.

12. In a process for converting a hydrocarbon material having at least one metal contaminant selected from the group consisting of nickel, vanadium, iron and copper which comprises contacting the hydrocarbon material in a reaction zone at hydrocarbon conversion conditions with a catalyst to form a conversion product and a deactivated catalyst having carbonaceous deposits and containing at least a portion of said metal contaminant, and regenerating at least a portion of said deactivated catalyst to restore at least a portion of the catalyst activity by removing at least a portion of said carbonaceous deposits to form a regenerated catayst, the improvement which comprises: contacting at least a portion of said regenerated catalyst with a liquid medium containing an effective amount of a silicon-containing material, a phosphorus-containing material and an aluminum-containing material for a time sufficient to permit at least a portion of said silicon-containing material, said phosphorus-containing and said aluminum-containing material to interact with said portion of said regenerated catalyst to form a treated catalyst containing atoms of silicon, aluminum and phosphorus from said silicon-, aluminum-, and phosphorus-containing material, respectively, and transferring at least a portion of said treated catalyst to said reaction zone.

13. The improved process of claim 12 wherein the liquid medium is water substantially free from contaminating metals.

14. The improved process of claim 12 wherein the liquid medium is an organic medium capable of dissolving at least a portion of said silicon-containing material and said material selected from said group.

15. The improved process of claims 13 or 14 wherein at least a portion of said washed catalyst is calcined prior to being transferred to said reaction zone.

16. In a process for converting a hydrocarbon material having at least one metal contaminant selected from the group consisting of nickel, vanadium, iron and copper which comprises contacting the hydrocarbon material in a reaction zone at hydrocarbon conversion conditions with a catalyst to form a conversion product and a deactivated catalyst having carbonaceous deposits and containing at least a portion of said metal contaminant, and regenerating at least a portion of said deactivated catalyst to restore at least a portion of the catalyst activity by removing at least a portion of said carbonaceous deposits to form a regenerated catalyst, the improvement which comprises: contacting at least a portion of said regenerated catalyst with a liquid medium containing an effective amount of a silicon-containing material, a phosphorus-containing material and an aluminum-containing material for a time sufficient to permit at least a portion of said silicon-containing material, said phosphorus-containing and said aluminum-containing material to interact with said portion of said regenerated catalyst to form a treated catalyst containing atoms of silicon, aluminum and phosphorus from said silicon-, aluminum-, and phosphorus-containing material, respectively, and transferring at least a portion of said treated catalyst to said reaction zone.

17. The improved process of claim 16 wherein said oxidative wash comprises a peroxide.

18. The improved process of claim 17 wherein said peroxide is hydrogen peroxide which is present at a concentration in a range of about five to about fifty pounds of peroxide per ton of treated catalyst contacted.

19. The improved process of claims 12 or 16 wherein the ratio of all silicon atoms from said silicon-containing material to all atoms selected from a group consisting of phosphorus and aluminum, respectively, from said phosphorus-containing material and said aluminum-containing material is in the range of about 0.1:1 to about 10:1.

* * * * *